F. P. DUNN.
SCALE.
APPLICATION FILED DEC. 30, 1909.
1,018,813.
Patented Feb. 27, 1912.
3 SHEETS—SHEET 1.
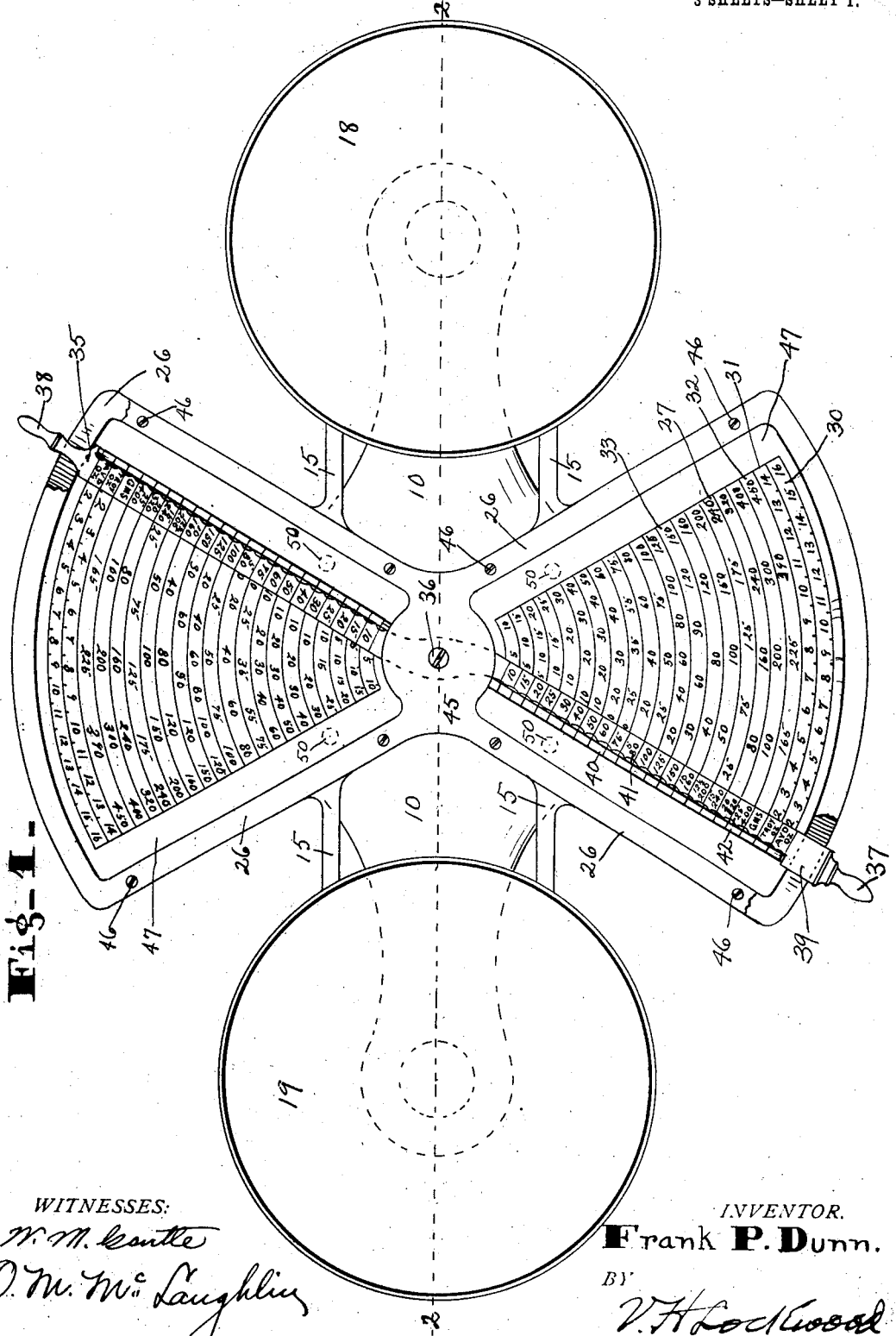
WITNESSES:
W. M. Castle
O. M. McLaughlin
INVENTOR.
Frank P. Dunn.
BY
V. H. Lockwood
ATTORNEY.

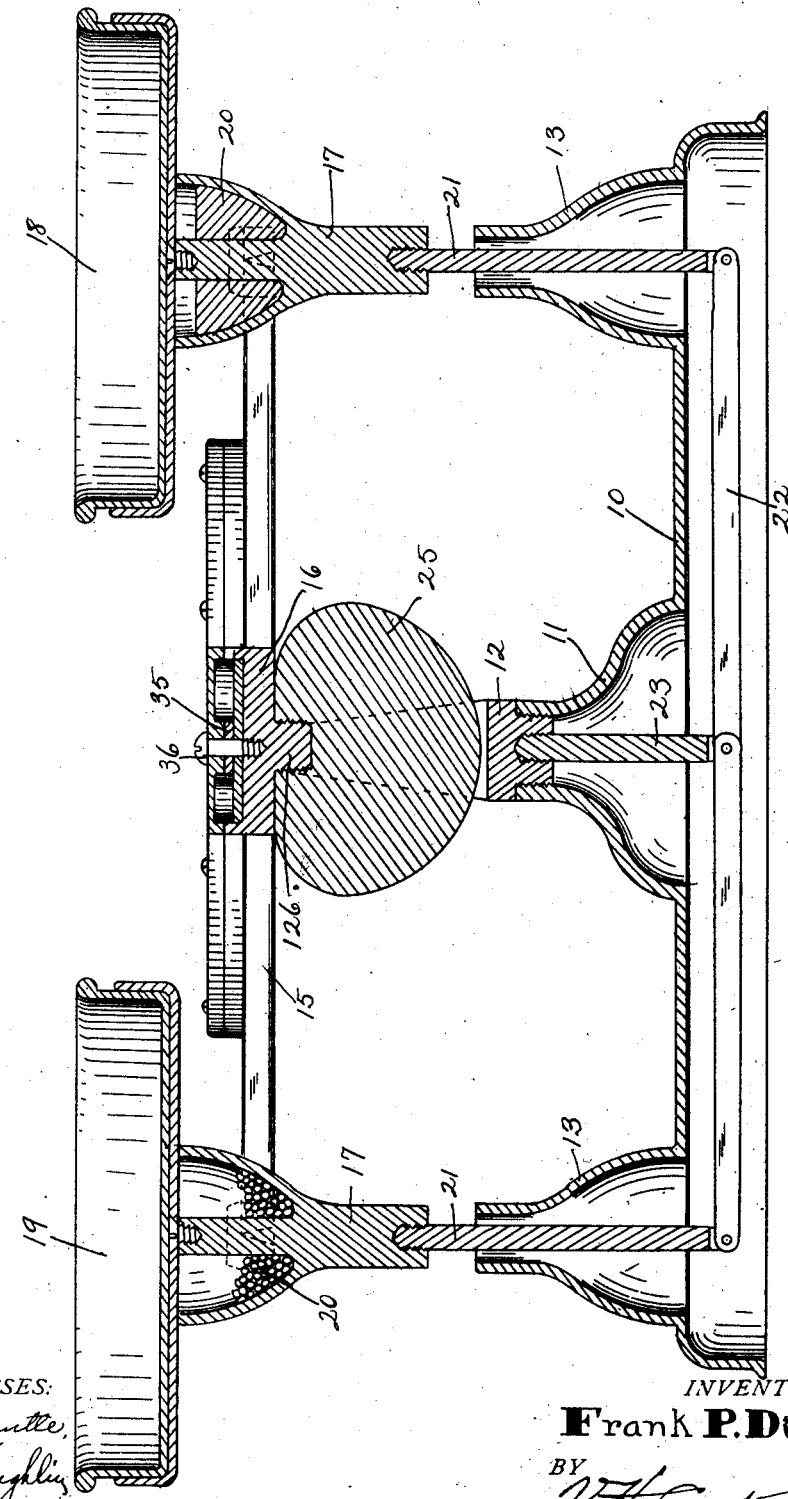

F. P. DUNN.
SCALE.
APPLICATION FILED DEC. 30, 1909.
1,018,813.
Patented Feb. 27, 1912.
3 SHEETS—SHEET 3.
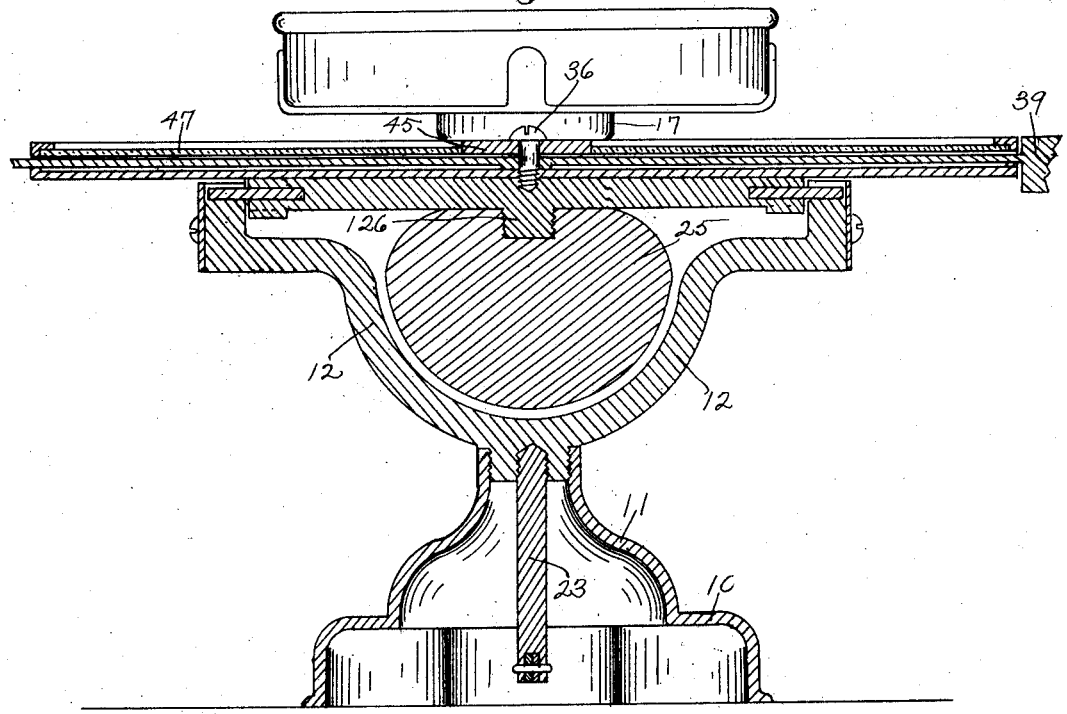
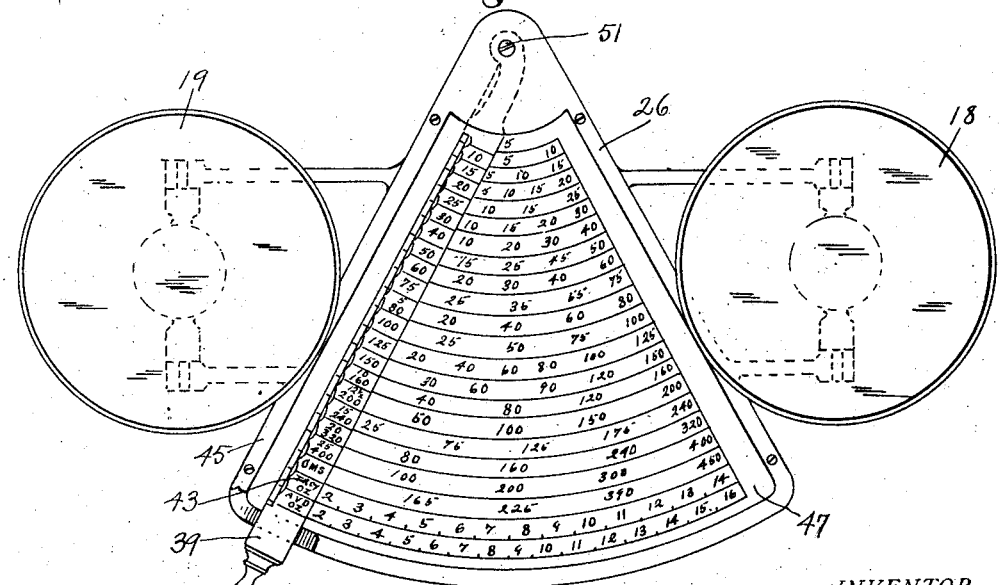
WITNESSES:
W. M. Gentle.
O. M. McLaughlin
INVENTOR.
Frank P. Dunn.
BY
F. H. Lockwood.
ATTORNEY.

UNITED STATES PATENT OFFICE.

FRANK P. DUNN, OF ANDERSON, INDIANA, ASSIGNOR, BY DIRECT AND MESNE ASSIGNMENTS, OF THIRTY ONE-HUNDREDTHS TO ANDERSON TOOL COMPANY, OF ANDERSON, INDIANA, A CORPORATION OF INDIANA, AND ONE-FOURTH TO OREVELL C. REEVES, OF TOLEDO, OHIO.

SCALE.

1,018,813. Specification of Letters Patent. Patented Feb. 27, 1912.

Application filed December 30, 1909. Serial No. 535,596.

*To all whom it may concern:*

Be it known that I, FRANK P. DUNN, of Anderson, county of Madison, and State of Indiana, have invented a certain new and useful Scale; and I do hereby declare that the following is a full, clear, and exact description thereof, reference being had to the accompanying drawings.

The object of this invention is to improve the construction of weighing scales, particularly computing scales, whereby there is simplification of construction and greater compactness, and the chart and other parts of the indicating means are in a horizontal position and visible to both the purchaser and salesman.

One feature of the invention consists in mounting the indicating means, preferably in a horizontal position, on the beam so it will move or oscillate therewith. Parts of the indicating means may be integral with the beam, and it is preferably central of the fulcrum of the beam. The movable part of the indicating means moves in the arc of a circle substantially parallel with the beam and horizontally, and is preferably pivoted, and such pivoting is preferably central of the beam.

Another feature of the invention is to make the members of the indicating means double, so as to show and read alike on both sides of the scale to enable both purchaser and salesman to operate or read the same.

Another feature of the invention consists in providing a pivoted poise movable away from and toward the load receiving member on the beam for counterbalancing any load, the zero position of said poise being next the load receiving member, and preferably it swings or moves across the fulcrum of the beam so as to increase the capacity of the scale.

Another feature of the invention consists in combining the poise and movable member of the indicating means so that the movable member of the indicating means serves as a poise, or the poise serves as a part of the indicating means. Preferably a weight is added to the end of the movable member of the indicator.

Another feature of the invention consists in providing on one member of the indicating means a series of prices per pounds and also a series of prices per ounces registering with the indications on the other indicating member.

The nature of the invention will be understood from the accompanying drawings and the following description and claims.

In the drawings Figure 1 is a plan view of one form of the invention. Fig. 2 is a central vertical section longitudinally of the scale shown in Fig. 1, showing the beam in balanced position. Fig. 3 is a central vertical transverse section through the same, with the ends of the combined indicator and poise partly broken away. Fig. 4 is a plan view of a modified form.

There is shown in the drawings a hollow base 10 elongated and having a hollow upwardly extending stand 11 located centrally thereof with the upper end of such stand internally threaded to receive the lower end of the fulcrum frame 12. The fulcrum frame has two arms united at their lower ends and separated at their upper ends, as shown in Fig. 3, and the arms of said fulcrum frame extend transversely of the base and above the base. At each end of the base there is an upwardly extending hollow stand 13.

The beam consists of a frame having bars 15 parallel with each other and the base and secured to a cross portion 16 at the center, and the central portion is fulcrumed on the ends of the fulcrum arms 12. The ends of the beam carry vertical funnel-shaped members 17, one of which carries a weight-receiving member 18, and the other carries a load-receiving member 19. These funnel-shaped members 17 are supplied with lead or shot 20. A rod 21 is rigidly secured to the lower end of each member 17 and extends down through the stand 13 and at its lower end is pivoted to a connecting bar 22, which at its inner end is pivoted to the lower end of the bar 23 that extends up centrally through the stand 11 and is secured to the lower end of the fulcrum frame 12. These parts are to maintain the weight- and load-receiving members in a horizontal position as they move up and down. A relatively large weight 25 is secured centrally to the underside of the beam and oscillates between the fulcrum arms 12. It is herein shown screwed upon a downwardly extending threaded projection 126 from the beam.

There is secured upon the beam 15, integrally or otherwise, one member 16 of the indicating means being over the fulcrum of the beam so it will rock therewith. In the first three figures this indicating means is a double fan-shaped plate with the apex of the fan-shaped ends united together, integrally if desired, and adapted to receive two similar fan-shaped cards 27. The large ends of the fan-shaped cards extend outwardly and the numerals thereon are arranged so as to be read from the respective sides of the scale. The first and outer line 30 of the numerals on each card indicates ounces avoirdupois. The next inner line 31 contains numerals indicating ounces troy. The next inner line 32 contains numerals indicating grams, and within these three outer lines 30, 31 and 32, there are several concentric lines 33 of numerals indicating the values of objects being weighed according to their weight, whether expressed in grams, troy ounces or avoirdupois ounces. Over said plate 26, forming a part of the stationary member of the indicating means and over the cards 27 therein, a movable indicator 35 extends, it being a bar fulcrumed centrally on the pin 36 that extends through the plate 26, and, as shown in Fig. 3, screws into the beam below. The center of that pivot is midway between the fulcrums and the ends of the beam. The indicator is double-ended, there being one end arranged for each card, and adapted to move over the cards by operating either the handle 37 or 38. The poise 39, whereby the weighing is determined, so far as the weight indications on the indicating cards are concerned, is secured to one end of the indicator 35, and the side of the machine on which said poise is located is preferably turned toward the position occupied by the salesman. On the indicator 35 the following indications are made: "Avd. oz." in position to register with the line of numerals "30", "Troy oz." in position to register with line 31 on the card, "Gms.", for grams, in position to register with the line 32 on the card, and certain other numerals indicating the prices-per-unit at which the article is sold, and they register with corresponding rows of numerals on the card. There are two series or kinds of price per unit numerals: The numerals 41, or larger numerals, represent prices-per pound, that is, cents per pound, while the numerals "5", "10" "15" and "25", to be found at intervals on the outer portion of said indicator and indicated by the reference numeral 42, represent prices per ounce. Therefore, with this scale so marked, one can determine the total value weighed when he knows either the price per ounce or price per pound.

Upon the plate 26 a cover 45 is placed, it being a skeleton frame, double fan-shaped, with a central plate held in place by the screw 36, and the outer edges by the small screws 46. Each section of this cover plate is preferably inclosed by glass 47 or other transparent material. The ends of parts 16 and 45 of said stationary member of the indicating means are spaced apart, as shown in Fig. 3, to permit the indicator 35 to extend and be oscillated between them.

The modified form shown in Fig. 4 is the same as that shown in the other figures, excepting that only a single fan-shaped member 26 of the indicating means is employed, and it is secured on the beam by fasteners 50 centrally of the beam and the fulcrum thereof. It is composed of the same parts as one end of the form shown in Fig. 1, excepting only one indicator is shown, and its end is fulcrumed by the pin 51, similar to the pin 36 in the apex of the fan-shaped plate 26. The card and index are identical in the two forms shown.

The shot or lead 20 shown in Fig. 1 is so disposed as to balance the beam and all the parts thereon when the combined indicator and poise 35 and 39, are at zero; namely, a remote position from a transverse line through the fulcrums or balancing-center device, and nearest the load receiving member. That is the zero position of the scale and is illustrated in Figs. 1 and 4. If half a pound be placed on the load receiving member 19, the scale will immediately unbalance, and in order to balance it, the operator takes the handle 37 and moves the poise and indicator to the right from the position shown in Fig. 1 until the scale balances, and in that event it would be at 8 ounces, or on the line above the fulcrums. If a pound weight instead were placed on the load-receiver, the scale would not balance until the indicator and poise were moved to the right-hand limit from the position shown in Figs. 1 and 4, that is, to 16 ounces. If it is desired to weigh more than one pound with the scales herein shown pound weights or the like are placed on the weight receiving member 18. While the scales herein shown are graduated only up to one pound, it is not desired to limit the invention to the range of utility that is shown in the drawings, as the chart may be devised for weighing more than one pound.

In the form shown in Fig. 1, assuming that the salesman is on the near side and the purchaser is on the opposite side of the scale, both the purchaser and salesman will be able to read the scale, and their readings will be alike, and, in fact, the scale can be operated from either side. But the poise is on only one end of the indicator and that must be heavy enough to counterbalance the other end.

The principle of operation may be better understood by referring to Fig. 4. It is observed there that the poise at zero is at the limit of the distance from the fulcrum toward the load-receiving member, but as it is operated the poise is moved away from the load-receiving member toward and even beyond the fulcrum. Furthermore, the poise and the indicator, or the movable members of the indicating means, whatever that might be, are combined and coöperate, the indicator adding weight to the poise and in a sense constituting a part thereof, and the handle 37 also constitutes a part of the poise. Hence it is practically an oscillatory poise, which serves not only as a poise but as the movable member of the indicating means; or on the other hand, it is a horizontally disposed indicator which serves also the purpose of a poise. The fulcrum of the combined poise and indicator should preferably be in a vertical plane through the fulcrum of the beam. It is not necessary, however, that the device be so arranged or that the poise and indicator move beyond the fulcrum, although the latter is preferable as it enlarges the capacity of the scale; but it is necessary that the device be so arranged that the poise will move away from the load-receiving member as the load is applied, to counter-balance the load and enable the indicator to show the result of the load.

What I claim as my invention and desire to secure by Letters Patent is:

1. A weighing scale including a fulcrumed beam, indicating means consisting of a member secured on the beam and having two similar sets of chart indications on opposite sides of the fulcrum and both readable from the respective sides of the beam on which they are located, an indicator pivoted between said charts and projecting in both directions from the pivot and movable across the chart, a poise weight secured to one end of said indicator, and a handle secured to each of the extreme outer ends of said indicator, whereby the indicator may be operated and the chart read from either side of the scale.

2. A weighing scale including a beam fulcrumed between its ends, indicating means consisting of a pair of fan-shaped members united at their apex and secured to and extending transversely of the beam and each member provided with similar graduations and indications readable from the respective sides of the scale, an indicator extending entirely across the two fan-shaped members and centrally pivoted between said members and provided on each end portion thereof with graduations and indications corresponding with the graduations and indications on the fan-shaped members, a poise weight secured to one end of said indicator, an outwardly projecting handle secured to each end of said indicator, a load receiving member mounted on the beam near one side of said fan-shaped member, and a weight receiving member mounted on the beam on the opposite side thereof, whereby the scale can be operated and read from both sides and the load and weight receiving members will be close to the fulcrum of the beam.

3. A weighing scale including a beam fulcrumed between its ends, a load receiving member on one end of the beam, a weight receiving member on the other end thereof, an indicating member fixed on the beam in horizontal position and between said load and weight receiving members and extending longitudinally of the beam to an equal extent on each side of the fulcrum and provided with a row of graduations and indications beginning with zero on the side of the fulcrum of the beam next to the load receiving member and extending in a direction away from the load receiving member to the side of the indicating member next to the weight receiving member, and an indicator extending transversely of said beam and pivoted so as to oscillate horizontally across said indicating member said indicating member being weighted.

In witness whereof, I have hereunto affixed my signature in the presence of the witnesses herein named.

FRANK P. DUNN.

Witnesses:
B. D. EMANUEL,
J. D. HOPPER.